(12) United States Patent
Maffeis

(10) Patent No.: US 9,457,482 B2
(45) Date of Patent: Oct. 4, 2016

(54) PROTECTIVE CASING OF ROBOT GRIPPERS

(71) Applicant: GIMATIC S.p.A., Roncadelle (BS) (IT)

(72) Inventor: Giuseppe Maffeis, Roncadelle (IT)

(73) Assignee: GIMATIC S.P.A., Roncadelle (BS) (IT)

( * ) Notice: Subject to any disclaimer, the term of this patent is extended or adjusted under 35 U.S.C. 154(b) by 0 days.

(21) Appl. No.: 14/616,339

(22) Filed: Feb. 6, 2015

(65) Prior Publication Data

US 2015/0224651 A1 Aug. 13, 2015

(30) Foreign Application Priority Data

Feb. 11, 2014 (IT) .............................. BS2014A0043

(51) Int. Cl.
*B66F 19/00* (2006.01)
*B25J 19/00* (2006.01)
*B25J 15/00* (2006.01)

(52) U.S. Cl.
CPC ......... *B25J 19/0083* (2013.01); *B25J 15/0028* (2013.01); *B25J 19/0075* (2013.01); *Y10S 901/39* (2013.01); *Y10S 901/49* (2013.01)

(58) Field of Classification Search
CPC .... B25J 15/00; B25J 15/026; B25J 15/0253; B25J 9/023; B25J 15/0009; B25J 15/0206; B25J 19/0083; B25J 15/0028; B25J 19/0075; B66C 1/54; H01L 21/68707; B25B 1/18; B25B 5/122; B21D 37/02; B23K 37/0531; Y10S 901/39; Y10S 901/49
USPC .......... 294/86.4, 192, 93, 103.1, 119.1, 213; 269/25, 32–34; 414/741, 751, 751.1; 901/36–39
See application file for complete search history.

(56) References Cited

U.S. PATENT DOCUMENTS

| 4,593,948 | A | * | 6/1986 | Borcea | B25J 13/081 294/106 |
|---|---|---|---|---|---|
| 4,762,455 | A | | 8/1988 | Coughlan et al. | |
| 4,808,898 | A | * | 2/1989 | Pearson | B25J 9/1015 294/119.1 |
| 4,892,344 | A | * | 1/1990 | Takada | B25J 15/0266 294/119.1 |
| 5,529,359 | A | * | 6/1996 | Borcea | B25J 15/0253 294/119.1 |
| 6,523,875 | B1 | * | 2/2003 | Ostholt | B25J 15/0253 294/119.1 |
| 2003/0080545 | A1 | | 5/2003 | Rosenkranz | |

FOREIGN PATENT DOCUMENTS

| DE | 10342166 A1 | 4/2005 |
|---|---|---|
| EP | 0138461 A2 | 4/1985 |
| IT | BS2012A000095 | 6/2012 |
| IT | BS2012A000162 | 11/2012 |
| JP | H11198082 A | 7/1999 |

* cited by examiner

*Primary Examiner* — Stephen Vu
(74) *Attorney, Agent, or Firm* — Volpe and Koenig, P.C.

(57) ABSTRACT

A protective casing of a gripper for industrial automation is described, having two or more jaws, which makes the gripper also usable in clean-room. The casing comprises a base fixable to an outer actuator, for example a robotic arm, and a dome. The dome and the base are air tightly constrainable one to another and they together define a chamber for housing the gripper. The dome is provided with through slots at the jaws of the gripper; the edges of the through slots air tightly adhere to the corresponding jaw. At least the portion of the dome at the through slots is elastically deformable to follow the movements of the jaws. Preferably, the dome and the base are coupled and flush in order to limit or prevent particles or dust from building up between interstices.

9 Claims, 3 Drawing Sheets

PROTECTIVE CASING OF ROBOT GRIPPERS

FIELD OF THE INVENTION

The present invention refers to a protective casing of robot grippers, in particular it refers to a protective casing that can be applied to grippers of robotic arms so that they can be used in clean-rooms according to GMP stringent regulations.

BACKGROUND

In industrial automation field, the use of robotic arms for handling objects is known. At the respective end, the robotic arms are provided with clamping grippers with two or more jaws. In particular, the grippers are provided with a body housing the jaws, or clamps, and the corresponding activating device. The jaws are movable between a first not-operating position or releasing position, where they don't apply any pressure on the piece to be manipulated and an operating position, or clamping position, where they apply a pressure on the piece to be manipulated adequate to provide the workpiece not becoming accidentally free during its movement. The device for activating the jaws can be of an electric, pneumatic, oleo-pneumatic, etc., type.

Depending on the number of the jaws and their movement, they can be grippers having two jaws, which can be parallel, radial or angular, grippers having three jaws, etc.

A kind of grippers has the clamping position corresponding to the jaws being proximal to the gripper longitudinal axis, for the external clamping of pieces that are inserted between the jaws themselves; the releasing position corresponds to the jaws distal from the gripper longitudinal axis.

In another kind of grippers, the clamping position corresponds to the jaws distal from the gripper longitudinal axis, for the inner clamping of pieces surrounding the jaws themselves; the releasing position corresponds to the jaws proximal to the gripper longitudinal axis.

Examples of grippers for industrial automation are provided in Italian Applications BS2012A000095, which describes a gripper with three jaws, and BS2012A000162, which describes a gripper with two parallel jaws, filed by the Applicant.

The Applicant found the need of using grippers also in the so-called clean-rooms, i.e. those environments with controlled atmosphere in which polluting microparticles must be removed, which otherwise would remain suspended in the air. The clean-rooms are mostly used to realize chemical and pharmaceutical laboratories.

In particular, the manufacturers of clean-rooms must adopt solutions to avoid instrumentations, objects and persons inside the room from polluting the air. The classification of clean-rooms is based on the count of microparticles having a diameter greater or equal to 0.5 µm in a defined volume of air (for example a cubic meter, in Europe). The count is made by means of a particle counter placed in the room. Fewer particles are counted, cleaner the clean-room is and better its quality class is.

In ISO regulations, the quality class is assigned according to a ranking from ISO-1 to ISO-9, where ISO-1 is the best performance and ISO-9 the worst.

In GMP European regulations, used in pharmaceutical field and considered as ones of the most restrictive, the quality class of clean-rooms is assigned by A, B, C and D letters, where A is the best performance and D the worst. For example, when a clean-room of A quality is used, the maximum number of particles admitted in the clean-room having a diameter greater or equal to 0.5 µm is 3520, and the maximum number of particles admitted in the clean-room having a diameter greater or equal to 5 µm is 20.

In view of what above, in clean-rooms the robotic arms are sealed with films or closed in rigid covers to avoid particles contained in the same arms from spreading in the air, for example originating from the wear of their components.

SUMMARY

Object of the present invention is to provide a protective casing that allows using also conventional grippers, used in the industrial automation, in clean-rooms.

Therefore, the present invention concerns a protective casing according to claim 1 for a gripper for industrial automation, with two or more jaws.

In particular, the protective casing comprises a base fixable to an outer actuator, for example a robotic arm, and a dome. The dome and the base are air tightly constrainable one to another and they together define a chamber for housing the gripper, or grippers if more than one. In other terms, when the dome is constrained to the base, the inner volume they define is for housing one or more grippers in an interchangeable way, so that the grippers can be replaced. The airtight sealing of the coupling between the base and the dome guarantees that polluting particles, in case originating from the mechanical wear of gripper components, cannot escape thereby polluting the surrounding environment, for example a clean-room.

Obviously the dome is closed, i.e. without holes, but for a number of through slots corresponding to the number of jaws of the gripper, or grippers. The edges of the through slots are designed for air tightly adhering to the corresponding jaw. In other words if the jaws are circular, the slots will be circular too; in general, the slots will have a shape complementary to jaws or a portion thereof in order to air tightly adhere.

Therefore only the jaws pass through the dome, or better a portion of the jaws passes, to which clamping fingers are then constrained, or other elements engaging the handled objects.

At least the portion of the dome at the through slots is elastically deformable to follow the movements of the jaws movable between a clamping position and a releasing position, as described in the known art.

The protective casing according to the present invention can be applied to most of the existing grippers—which have often a standardized size, precisely—with no necessary changes. Therefore, the protective casing can be used also as retrofit of existing grippers.

Advantageously, the herein described protective casing makes the grippers adapted to be used also in environments with protective atmosphere, as the clean-rooms in chemical or pharmaceutical laboratories, or some environments in food industries.

In practice, the protective casing makes a barrier against the entrance and the escape of particles and microparticles in/from the room defined by the dome and the base. Laboratory tests demonstrated that the protective casing allows using a conventional gripper in clean-rooms too, obtaining a low ISO and respecting the most stringent European GMP regulations.

The person skilled in the field will obviously understand that the gripper can be of a conventional type with an electric, pneumatic, oleo-pneumatic, magnetic actuator, etc., with two or more jaws. In this point of view, the casing can be sold separately from the gripper, as an accessory for applications requiring the gripper confining. In turn, more than one gripper can be housed inside the dome.

Preferably, the dome is made of an elastic and/or soft material. For example, materials suitable for the purpose are silicone and neoprene. Obviously other materials can be used, for example rubber, etc., according to applications and respective regulations provided by the legislator.

In another embodiment, which is particularly useful for the use with grippers equipped with sensors and luminous indicators, the dome is made of a transparent material allowing an operator to see these indicators through the dome. Alternatively, the dome can be provided with transparent portions, for example windows obtained by a transparent material co-molded on the remaining part of the dome, which in this case can be matt.

Preferably, in an intermediate portion between the through slots, the dome has one or more portions with controlled deformation, named fold lines, or ribs, arranged as dips or humps. At the fold lines, the dome is curved and flattened in order to follow the approach or removal reciprocal movement, respectively, of the jaws of every gripper. In practice, the dips or humps aid the localized elastic deformation of the dome, so that the jaws do not face resistance while moving.

Preferably, the base is provided with a perimetrical throat and the lower edge of the dome is shaped to be air tightly coupled with the perimetrical throat.

In the preferred embodiment, the perimetrical throat is defined by an undercut of the base; the dome engages the undercut by means of its own lower edge substantially protruding 90° inwardly. This arrangement makes the dome on the outside being anyway flush with the base. This expedient allows to avoid that particles and dust could build up in interstices.

Preferably, the base is provided with electric and/or mechanical connections and/or guides for electric cables or working fluidic connections of the outer actuator. Evidently during the use, when the gripper is assembled on a robotic arm and covered by the casing, these interfaces are on the inside and not open to the air.

Preferably, the protective casing further comprises an adapting element fixable to the base. The adapting element accommodates the gripper interchangeably to allow a quick replacement thereof.

Preferably, a gasket can be interposed between the base and the outer actuator.

Preferably, the perimetrical throat of the base is slightly deformable and the protective casing comprises means for clamping the throat against the dome to prevent the release thereof, for example screws meshing through the base.

A further object of the present invention is to provide an assembly comprising at least one gripper having two or more jaws and the respective protective casing, usable in clean-rooms, also in compliance with the more stringent regulations on the subject.

Therefore, in its second aspect the present invention concerns an assembly according to claim 11, which comprises at least one conventional gripper for industrial automation, of the type having two or more jaws, and a protective casing of the above described type.

BRIEF DESCRIPTION OF THE DRAWINGS

Further characteristics and advantages of the invention will be more evident from a review of the following specification of a preferred, but not exclusive, embodiment, shown for illustration purposes only and without limitation, with the aid of the attached drawings, in which.

DETAILED DESCRIPTION OF THE PREFERRED EMBODIMENTS

Figure 1:
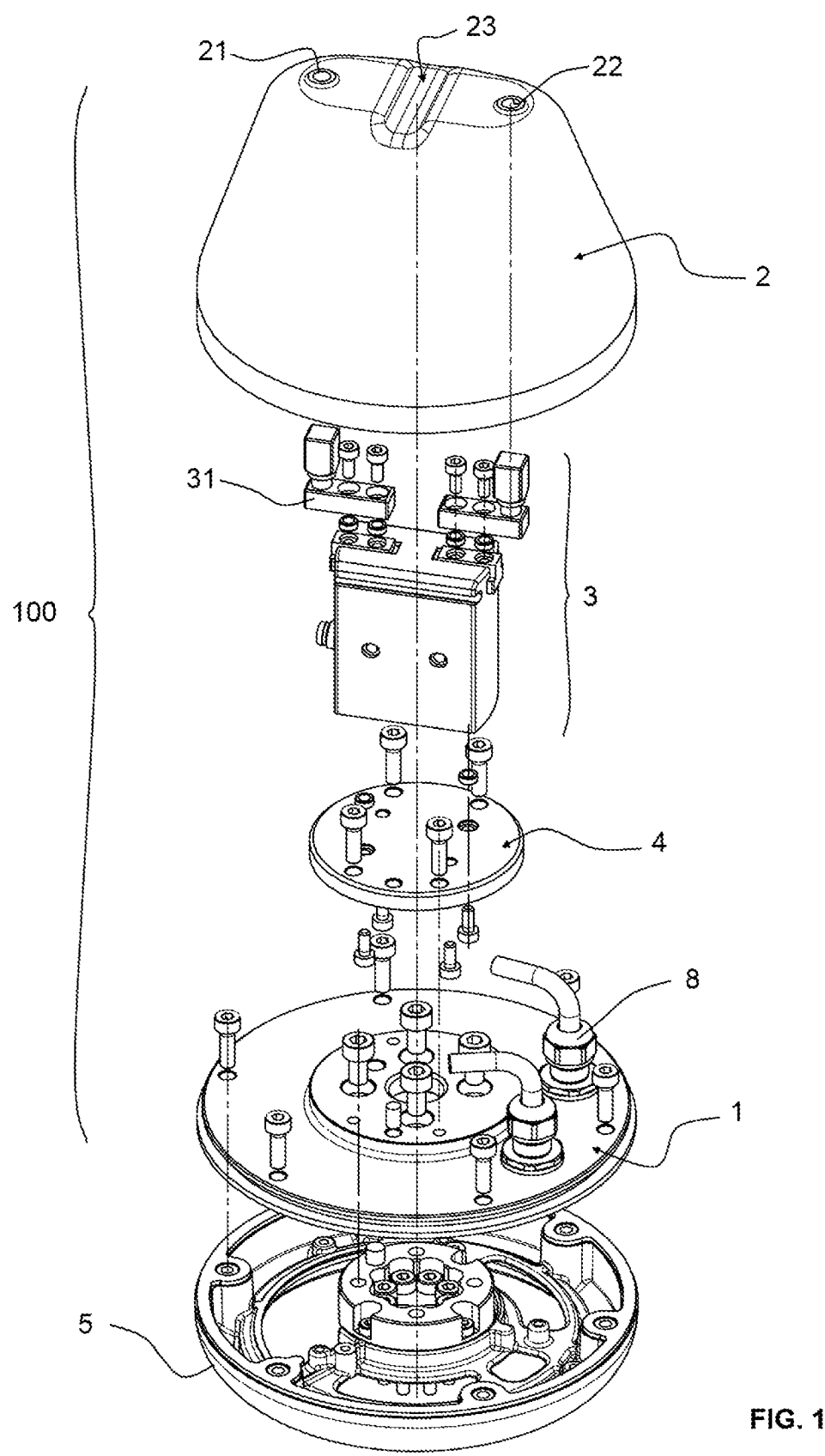
FIG. 1 is an exploded view of an assembly comprising a gripper and a protective casing according to the present invention.
Figure 2:
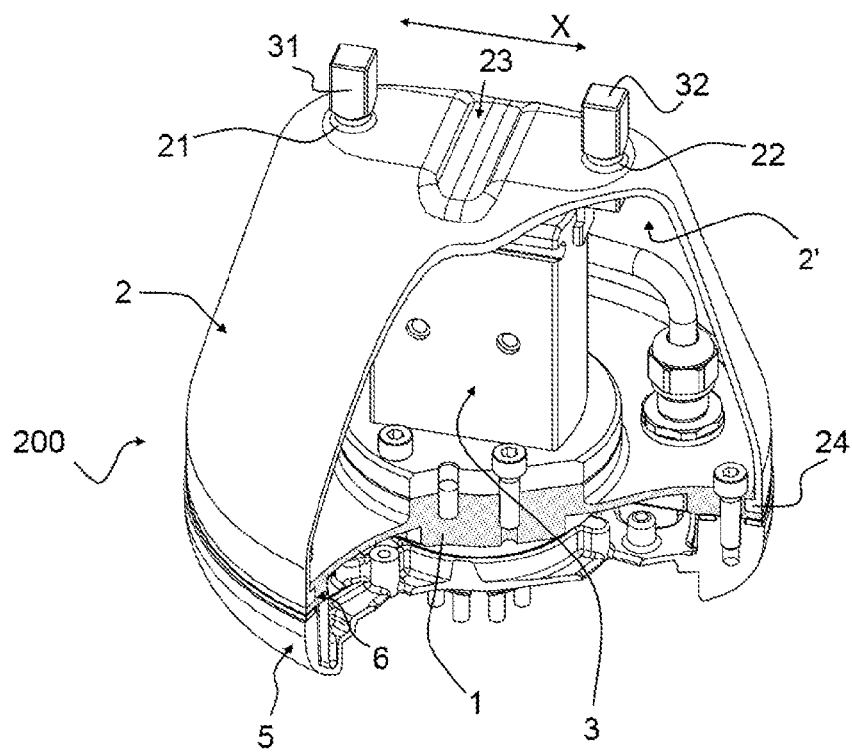
FIG. 2 is a perspective and partially sectioned view of the assembly shown in FIG. 1.
Figure 3:
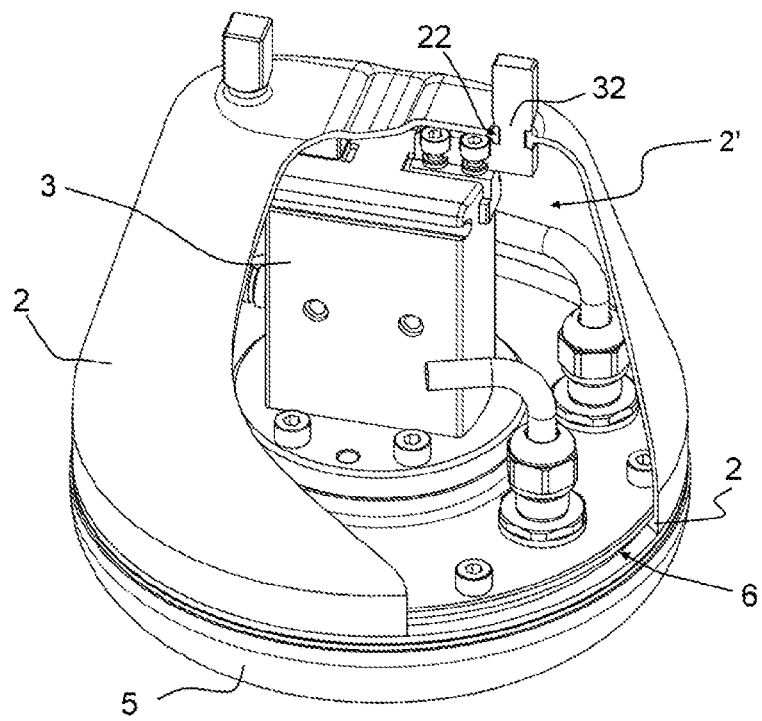
FIG. 3 is a perspective and partially sectioned view of the assembly shown in FIG. 1.

FIGS. 1-4 show an assembly 100 according to the present invention, couplable with a support 5 of a robotic arm (not shown), for example an arm of VS-050 series produced by DENSO company for applications in pharmaceutical field.

Basically, the assembly 100 comprises a protective casing 200 according to the present invention and a gripper 3. The casing 200, in its turn, comprises a base 1 constrainable to the support 5, and a dome 2 fixable to the base 1. In the embodiment shown in figures, the dome 2 is shaped as a hood having a circular base and an elliptical top.

The skilled person will comprise that the shape of the dome 2 can be different from that one shown, to second the needs imposed by the application the assembly is designed for.

In the volume inside the dome 2, i.e. in the closed room 2' defined by the dome 2 and the base 1, a gripper 3 can be placed of the type usually used in industrial automation. In the figures a gripper 3 with two jaws 31, 32 is shown, the jaws moving alternately in the X direction between the clamping and the releasing positions, however the number of jaws can be greater, for example three, four, etc. Clamping elements specific for the required application can be constrained to the jaws 31, 32, for example mechanical fingers, pads, etc.

For the purposes of the present invention, the type of actuator used to move the jaws 31, 32 between the clamping position and the releasing position is not relevant. The actuator, inside the body of the gripper 3, can be electric, pneumatic, etc.

The jaws 31 and 32 of the gripper 3 come out from the dome 2 by corresponding through slots 21, 22 that tightly adhere to the jaws. Preferably, the through slots 21, 22 are circular in order to optimize the air tight seal on corresponding circular portions of the jaws 31, 32. The air tight seal is assured by the strain the dome material applies against the jaws 31, 32.

The dome 2 is made of an elastic material, for example rubber, neoprene, silicone, etc. Independently from the used material, the dome 2 must be elastically deformable to follow the movement of the jaws 31, 32 without opposing resistance and breaking or cracking, and to air tightly adhere to the base 1 and jaws 31, 32.

For applications providing for the use of a gripper 3 equipped with warning lights and functioning indicators, the dome 2 is preferably transparent to allow an operator to check the conditions of the warning lights which otherwise would be invisible from the outside of the dome 2. Alternatively, the dome 2 can be made matt but with windows made of transparent material, for example co-molded with the dome 2.

About the coupling of the dome 2 with the base 1, it is obtained by providing the base 1 with a perimetrical throat 6 in which the lower edge 24 of the dome 2 engages. For example, in an embodiment the base 1 is made of a rigid material, i.e. metal or rigid plastic, and the throat 6 is obtained as an undercut in which a portion of the lower edge 24 of the dome 2 is inserted as cantileverly protruding from the side wall of the dome 2 itself.

The insertion of the lower edge 24 into the perimetrical throat 6 makes a shape coupling that, in any case, leaves the outer surface of the dome 2 flush with the outer surface of the base 1, in order to not define interstices in which particles or dust could build up, the latter not being permissible in clean-rooms and in environments with protective atmosphere.

Figure 4:
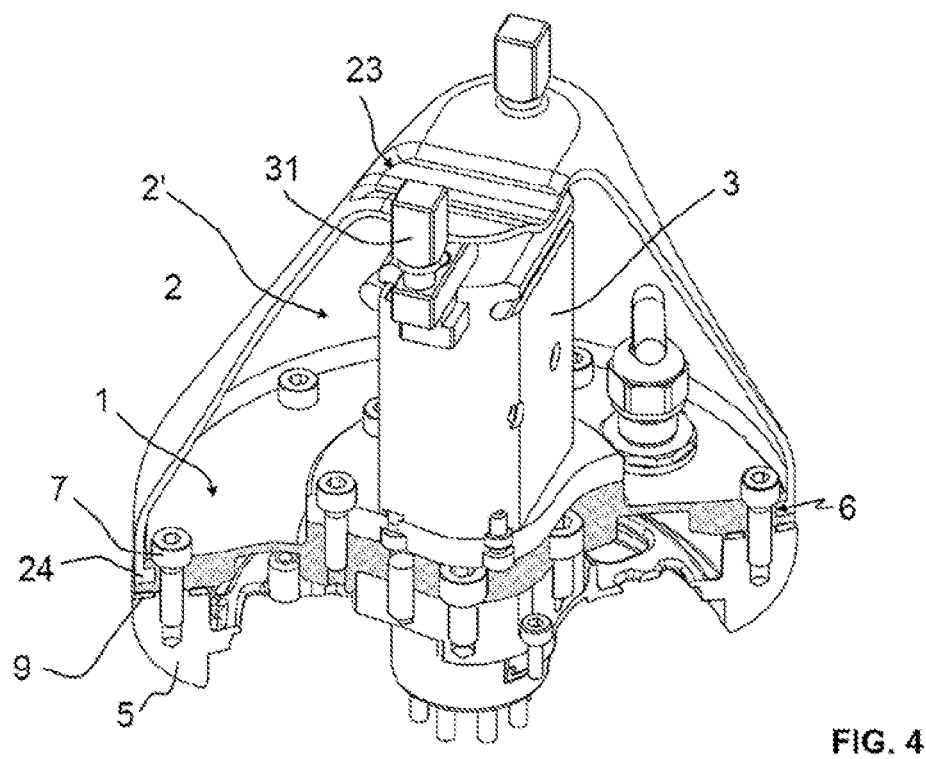
FIG. 4 is a perspective and partially sectioned view of the assembly shown in FIG. 1.

In particular, FIG. 4 shows clearly the lower edge 24 of the dome 2 inserted in the perimetrical throat 6 of the base 1; the dome 2 on the outside remaining flush with the base 1. Preferably, a plurality of screws 7 constrain the base 1 to the support 5 of the robotic arm and, at the same time, tighten the throat 6 on the lower edge 24 of the throat 6 by locking it in the position shown in figures and preventing the dome 2 from escaping accidentally from the base 1, but at the same time allowing the manual removal for the part replacement.

The dome 2 is provided with at least one fold line 23. The fold line 23 is a dip or hump extending in a direction substantially orthogonal to the direction X of translation of the jaws. At the fold line 23 the dome deforms more easily, by following the approach and removal movement of the jaws 31, 32 without creating additional folds in the material of the dome 2.

Preferably, as shown in the figures, the assembly comprises an adapting element 4 fixable to the base, which provides a direct support for the gripper 3 in order to aid the interchangeability thereof.

Through the base 1 electric connections 8 and/or guides for cables or lines extend, which supply a working fluid, for example compressed air, etc.

A gasket 9 is preferably interposed between the base 1 and the support 5 of the robotic arm to assure the air tight seal.

Figure 5:
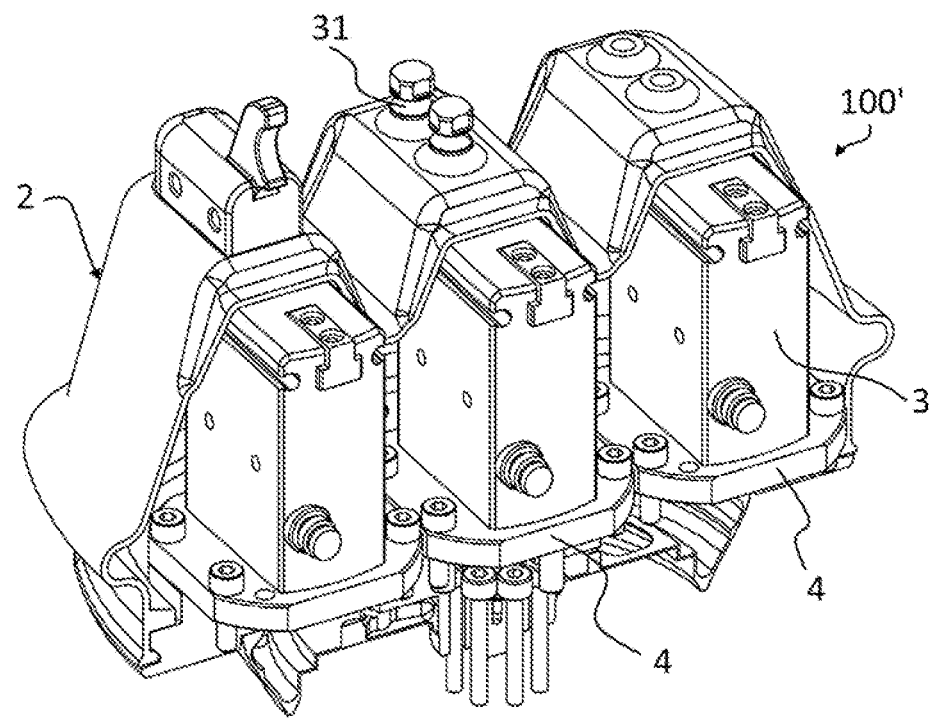
FIG. 5 is a perspective view of a gripper modification having six jaws according to the present invention.

FIG. 5 shows an embodiment 100' of the assembly according to the present invention, provided with six jaws, obviously grouped in couples, two for each of the three shown grippers 3. It has to be noticed that in this embodiment each gripper 3 is provided with a corresponding adapting element 4 fixable to the base, which provides a direct support for the gripper 3 in order to aid the interchangeability thereof. In other words, the three adapting elements 4 are separated and distinct so as to be able to change, if needed, only one gripper 3.

The invention claimed is:

1. A protective casing (200) of at least one gripper (3) for industrial automation, having two or more jaws (31, 32), the protective casing (200) comprising a base (1) fixable to an outer actuator and a dome (2),
   wherein the dome (2) and the base (1) are air tightly constrainable one to another and they together define a chamber (2') for housing at least one gripper (3), and
   wherein the dome (2) is provided with as many through slots (21, 22) as the jaws (31, 32), with edges of the through slots (21, 22) being designed for air tightly adhering to the corresponding jaw (31, 32) extending through the dome (2),
   wherein the dome (2) is elastically deformable, at least next to the through slots (21, 22), to follow the movements of the jaws (31, 32),
   wherein the base (1) is provided with a perimetrical throat (6), and wherein a lower edge (24) of the dome (2) is shaped to be air tightly coupled with said perimetrical throat (6); and wherein the perimetrical throat (6) is defined by an undercut of the base (1) and the dome (2) engages said undercut by means of a lower edge (24) substantially protruding at 90° on an outside being flush with the base (1) to avoid particles from building up at the perimetrical throat (6) between the base (1) and the dome (2).

2. The protective casing (200) according to claim 1, wherein the dome (2) has no holes except for the through slots (21, 22).

3. The protective casing (200) according to claim 1, wherein the dome is made of a material selected from the group consisting of: silicone, rubber and neoprene.

4. The protective casing (200) according to claim 1, wherein between the through slots (21, 22), the dome (2) has one or more fold lines (23), defined by dips or humps, at which the dome (2) is curved and flattened in order to follow an approaching or a diverging movement, respectively, of the jaws (31, 32) of the gripper or grippers (3).

5. The protective casing (200) according to claim 1, wherein the base (1) is provided with electric and/or mechanical connections (8) and/or guides for electric cables or fluidic connections of the outer actuator.

6. The protective casing (200) according to claim 1, wherein the dome is made of a transparent material or it is provided with transparent portions allowing to check, from the outside, the conditions of the gripper (3).

7. An assembly (100) comprising:
   at least one gripper (3), for industrial automation, having two or more jaws (31, 32) movable between a first non-operating position or releasing position, where the jaws do not apply any pressure on the piece to be manipulated, and an operating position, or gripping position, where the jaws apply a pressure on the piece to be manipulated adequate to provide the workpiece not becoming accidentally free during its movement, and
   a protective casing (200) according claim 1, wherein each gripper (3) is housed in the chamber (2') defined by the dome (2) coupled to the base (1).

8. A protective casing (200) of at least one gripper (3) for industrial automation, having two or more jaws (31, 32), the protective casing (200) comprising a base (1) fixable to an outer actuator, and a dome (2),
   wherein the dome (2) and the base (1) are air tightly constrainable one to another and they together define a chamber (2') for housing at least one gripper (3), and
   wherein the dome (2) is provided with as many through slots (21, 22) as the jaws (31, 32), the edges of the through slots (21, 22) being designed for air tightly adhering to the corresponding jaw (31, 32) extending through the dome (2), further comprising, for each gripper, an adapting element (4) fixable to the base (1), wherein the adapting element (4) accommodates the corresponding gripper (3) interchangeably.

9. A protective casing (200) of at least one gripper (3) for industrial automation, having two or more jaws (31, 32), the protective casing (200) comprising a base (1) fixable to an outer actuator, and a dome (2), wherein the dome (2) and the base (1) are air tightly constrainable one to another and they together define a chamber (2') for housing at least one gripper (3), and, wherein the dome (2) is provided with as many through slots (21, 22) as the jaws (31, 32), the edges of the through slots (21, 22) being designed for air tightly adhering to the corresponding jaw (31, 32) extending through the dome (2), further comprising at least one of:

a gasket that can be interposed between the base and the outer actuator; or means to tighten internally the perimetrical throat (6) onto the dome (2), in order to avoid the disengagement thereof.

\* \* \* \* \*